US012702612B2

(12) United States Patent
Shimoda et al.

(10) Patent No.: US 12,702,612 B2
(45) Date of Patent: Aug. 11, 2026

(54) PATIENT SUPPORT

(71) Applicant: Stryker Corporation, Kalamazoo, MI (US)

(72) Inventors: Robyn Yukie Shimoda, Honolulu, HI (US); Ryan Ariel Alvarez, Kalamazoo, MI (US); James K. Galer, Byron Center, MI (US); Brian Cheadle, Kalamazoo, MI (US); David Scharich, III, Coloma, MI (US)

(73) Assignee: Stryker Corporation, Portage, MI (US)

( * ) Notice: Subject to any disclaimer, the term of this patent is extended or adjusted under 35 U.S.C. 154(b) by 218 days.

(21) Appl. No.: 18/224,623

(22) Filed: Jul. 21, 2023

(65) Prior Publication Data

US 2024/0024184 A1 Jan. 25, 2024

Related U.S. Application Data

(60) Provisional application No. 63/391,436, filed on Jul. 22, 2022.

(51) Int. Cl.
*A61G 13/12* (2006.01)
*A47C 27/08* (2006.01)

(52) U.S. Cl.
CPC ........ *A61G 13/1265* (2013.01); *A47C 27/082* (2013.01)

(58) Field of Classification Search
CPC ................ A61G 13/1265; A61G 7/002; A61G 7/05776; A61G 7/05769; A61G 2200/16; A47C 27/082; A47C 19/04
USPC ............................................ 5/600, 710, 713
See application file for complete search history.

(56) References Cited

U.S. PATENT DOCUMENTS

| | | | | |
|---|---|---|---|---|
| 3,822,425 | A | 7/1974 | Scales | |
| 4,486,909 | A | 12/1984 | McKneelan | |
| 4,521,970 | A | 6/1985 | Jester | |
| 4,660,240 | A | 4/1987 | Hutton et al. | |
| 4,768,249 | A | 9/1988 | Goodwin | |
| 4,941,221 | A * | 7/1990 | Kanzler | A47C 20/048 5/607 |
| 5,083,332 | A | 1/1992 | Foster et al. | |
| 5,179,744 | A | 1/1993 | Foster et al. | |
| 5,243,721 | A | 9/1993 | Teasdale | |
| 5,421,044 | A | 6/1995 | Steensen | |
| 5,894,966 | A | 4/1999 | Bobey et al. | |
| 5,956,787 | A | 9/1999 | James et al. | |
| 6,021,533 | A | 2/2000 | Ellis et al. | |
| 6,085,372 | A | 7/2000 | James et al. | |

(Continued)

FOREIGN PATENT DOCUMENTS

| | | |
|---|---|---|
| EP | 1 011 391 | 6/2000 |
| EP | 1 985 273 | 7/2014 |

(Continued)

*Primary Examiner* — David R Hare
(74) *Attorney, Agent, or Firm* — Warner Norcross + Judd LLP

(57) ABSTRACT

A patient support is provided in the form of a mattress for supporting a patient on a bed, such as a hospital bed, and a mattress cover. The mattress and mattress cover may be configured to expand and contract to accommodate larger patients, such as bariatric patients, and to return the mattress and its cover to their unexpanded configuration, or in some cases an intermediate configuration, without requiring user adjustments to the cover.

18 Claims, 10 Drawing Sheets

(56) References Cited

U.S. PATENT DOCUMENTS

| | | | | |
|---|---|---|---|---|
| 6,098,000 | A | 8/2000 | Long et al. | |
| 6,178,578 | B1 | 1/2001 | Soltani et al. | |
| 6,202,672 | B1 | 3/2001 | Ellis et al. | |
| 6,240,584 | B1 | 6/2001 | Perez et al. | |
| 6,243,894 | B1 | 6/2001 | Kosumsuppamala et al. | |
| 6,295,675 | B1 | 10/2001 | Ellis et al. | |
| 6,357,065 | B1 * | 3/2002 | Adams | A61G 7/005 5/617 |
| 6,418,579 | B2 | 7/2002 | Perez et al. | |
| 6,427,538 | B1 | 8/2002 | Potter | |
| 6,430,763 | B2 | 8/2002 | Kosumsuppamala et al. | |
| 6,467,113 | B2 | 10/2002 | Ellis et al. | |
| 6,568,013 | B2 | 5/2003 | Perez et al. | |
| 6,668,399 | B2 | 12/2003 | Malstaff et al. | |
| 6,760,939 | B2 | 7/2004 | Ellis et al. | |
| 6,826,795 | B2 | 12/2004 | Wilkinson | |
| 6,859,961 | B1 | 3/2005 | Barr | |
| 7,028,352 | B2 | 4/2006 | Kramer et al. | |
| 7,028,358 | B2 * | 4/2006 | Liu | A61G 7/05776 5/713 |
| 7,086,104 | B1 | 8/2006 | Tsay | |
| 7,111,348 | B2 | 9/2006 | Ellis et al. | |
| 7,155,766 | B1 | 1/2007 | Gilchrest, Jr. et al. | |
| 7,225,489 | B1 * | 6/2007 | Frickey | A47C 19/04 5/722 |
| 7,260,860 | B2 * | 8/2007 | Chambers | A61G 7/0507 5/713 |
| 7,308,725 | B2 | 12/2007 | Cazzini et al. | |
| 7,328,472 | B2 | 2/2008 | Chaffee | |
| 7,353,556 | B2 | 4/2008 | Ellis et al. | |
| 7,363,663 | B2 | 4/2008 | Chambers et al. | |
| 7,380,302 | B2 | 6/2008 | Gilchrest, Jr. et al. | |
| 7,398,573 | B2 | 7/2008 | Ellis et al. | |
| 7,464,425 | B2 | 12/2008 | Chambers et al. | |
| 7,475,440 | B2 | 1/2009 | Chaffee | |
| 7,565,710 | B2 | 7/2009 | Chambers et al. | |
| 7,698,765 | B2 | 4/2010 | Bobey et al. | |
| 7,735,171 | B2 | 6/2010 | Kan | |
| 7,779,496 | B2 | 8/2010 | Crousore et al. | |
| 7,784,131 | B2 | 8/2010 | Genaro et al. | |
| 7,832,039 | B2 | 11/2010 | Chambers et al. | |
| 7,845,032 | B2 | 12/2010 | Chambers et al. | |
| 7,904,977 | B1 | 3/2011 | Singh | |
| 7,971,300 | B2 | 7/2011 | Wilker, Jr. | |
| 8,122,545 | B2 | 2/2012 | Wilkinson | |
| 8,122,546 | B2 | 2/2012 | Chambers et al. | |
| 8,146,191 | B2 | 4/2012 | Bobey et al. | |
| 8,171,588 | B2 | 5/2012 | Chambers et al. | |
| 8,225,444 | B2 | 7/2012 | Chaffee | |
| 8,234,727 | B2 | 8/2012 | Schreiber et al. | |
| 8,336,143 | B2 * | 12/2012 | Lemmer | A47C 27/081 5/710 |
| 8,434,177 | B2 | 5/2013 | Chaffee | |
| 8,650,686 | B2 * | 2/2014 | Biggie | A61G 7/05776 5/713 |
| 8,789,224 | B2 | 7/2014 | Wyatt et al. | |
| 8,826,478 | B2 | 9/2014 | Chaffee | |
| 8,943,627 | B2 | 2/2015 | Wilkinson | |
| 9,049,943 | B2 | 6/2015 | Caminade et al. | |
| 9,095,224 | B2 | 8/2015 | Tanaka et al. | |
| 9,101,224 | B2 | 8/2015 | Chiang et al. | |
| 9,114,048 | B2 | 8/2015 | Takeda et al. | |
| 9,204,732 | B2 | 12/2015 | Wyatt et al. | |
| 9,205,011 | B2 | 12/2015 | Pile | |
| 9,526,349 | B2 | 12/2016 | Lafleche et al. | |
| 9,566,202 | B2 | 2/2017 | Chiang et al. | |
| 9,585,490 | B2 | 3/2017 | Pile | |
| 9,597,244 | B2 | 3/2017 | Ishibashi et al. | |
| 9,707,141 | B2 | 7/2017 | Bobey et al. | |
| 9,709,183 | B2 | 7/2017 | Frayne | |
| 9,737,153 | B2 | 8/2017 | Chaffee | |
| 9,757,293 | B2 | 9/2017 | Turner et al. | |
| 9,826,842 | B2 | 11/2017 | Wilkinson | |
| 9,867,748 | B2 | 1/2018 | Takeda et al. | |
| 9,925,102 | B2 | 3/2018 | Turner | |
| 10,070,733 | B2 | 9/2018 | Ohno et al. | |
| 10,143,609 | B2 | 12/2018 | Chiang et al. | |
| 10,334,959 | B2 | 7/2019 | Ohno et al. | |
| 10,335,335 | B2 | 7/2019 | Ohno et al. | |
| 10,352,804 | B2 | 7/2019 | Moniaci | |
| 10,357,414 | B2 | 7/2019 | Bossingham et al. | |
| 10,426,680 | B2 | 10/2019 | Williams et al. | |
| RE47,680 | E | 11/2019 | Chiang et al. | |
| 10,463,165 | B2 | 11/2019 | Ishibashi et al. | |
| 10,463,554 | B2 | 11/2019 | O'Reagan et al. | |
| 10,492,619 | B2 | 12/2019 | Ohno | |
| 10,543,148 | B1 | 1/2020 | Shih | |
| 10,646,391 | B2 | 5/2020 | Ohno et al. | |
| 10,653,575 | B2 | 5/2020 | Stroh et al. | |
| 11,173,085 | B2 | 11/2021 | Galer et al. | |
| 11,324,335 | B2 | 5/2022 | Huang et al. | |
| 11,484,449 | B2 * | 11/2022 | Tumavich | A61G 7/015 |
| 2004/0255386 | A1 * | 12/2004 | Liu | A61G 7/05776 5/710 |
| 2005/0081300 | A1 | 4/2005 | O'Reagan et al. | |
| 2005/0114998 | A1 | 6/2005 | Leventhal et al. | |
| 2006/0101580 | A1 * | 5/2006 | Biggie | A61G 7/05776 5/713 |
| 2007/0209119 | A1 | 9/2007 | Chun-chu | |
| 2008/0078966 | A1 | 4/2008 | Chang | |
| 2008/0155755 | A1 | 7/2008 | Crousore et al. | |
| 2011/0047709 | A1 | 3/2011 | Tarsaud et al. | |
| 2011/0162147 | A1 | 7/2011 | Gatzke | |
| 2012/0272456 | A1 * | 11/2012 | Lemmer | A47C 27/081 5/710 |
| 2012/0297540 | A1 | 11/2012 | Thomas et al. | |
| 2014/0026325 | A1 * | 1/2014 | Guthrie | A61G 7/05776 5/709 |
| 2014/0047641 | A1 * | 2/2014 | Thodupunuri | A61G 7/0514 5/613 |
| 2016/0184154 | A1 | 6/2016 | Lafleche et al. | |
| 2017/0027786 | A1 * | 2/2017 | Williams | A61G 7/05776 |
| 2017/0128298 | A1 | 5/2017 | Gowda et al. | |
| 2017/0319413 | A1 * | 11/2017 | O'Reagan | A61G 7/05776 |
| 2018/0042763 | A1 | 2/2018 | Galer et al. | |
| 2018/0147101 | A1 | 5/2018 | Bossingham et al. | |
| 2019/0116987 | A1 | 4/2019 | Clousing et al. | |
| 2019/0151175 | A1 | 5/2019 | Kelch et al. | |
| 2019/0174930 | A1 | 6/2019 | DeFranks et al. | |
| 2019/0174931 | A1 | 6/2019 | Ohno | |
| 2019/0201261 | A1 * | 7/2019 | Galer | A47C 27/003 |
| 2019/0336371 | A1 | 11/2019 | Abu Al-Rubb | |
| 2019/0350786 | A1 | 11/2019 | Sachdev et al. | |
| 2020/0054149 | A1 | 2/2020 | Ohno | |
| 2020/0113347 | A1 | 4/2020 | Cheng | |
| 2021/0045947 | A1 * | 2/2021 | Tumavich | A61G 7/002 |
| 2023/0248597 | A1 | 8/2023 | Sommer et al. | |
| 2023/0248599 | A1 | 8/2023 | Ross et al. | |

FOREIGN PATENT DOCUMENTS

| | | |
|---|---|---|
| WO | 96/28056 | 9/1996 |
| WO | 02/15835 | 2/2002 |
| WO | 2002/065877 | 8/2002 |
| WO | 2009/042647 | 4/2009 |

* cited by examiner

PATIENT SUPPORT

TECHNICAL FIELD AND BACKGROUND OF THE DISCLOSURE

The present disclosure generally relates to a patient support, such as a mattress, and more particularly to a patient support that can be adjusted in width and/or length to accommodate patients of different sizes.

Mattresses for bariatric beds have been developed that can be increased in width (and/or length) by adding inserts, such as foam inserts, to the side of the main patient support cushion of the mattress. The inserts may be inserted into flexible sleeves that are attached to the side of the main patient support cushion of the mattress. To accommodate the different widths of the mattress, mattress covers have been constructed with expandible side panels that use a series of zippers formed from zipper sections to configure the side panels in unexpanded and expanded configurations, which require the caregiver to unzip and zip the appropriate zipper sections together. To add or remove the insert, the caregiver unzips the zipper and opens the cover and manually inserts or pulls the insert or inserts from the sleeve or sleeves. When removing the inserts, the caregiver typically folds and tucks the unfilled sleeve into the cover and closes the cover with the appropriate zipper sections to reconfigure the side panel or side panels of the cover to their unexpanded configuration so that the cover fits snuggly against the mattress.

More recently, sealed sleeves that form inflatable expansion bladders are located along the sides of the main patient support cushion of the mattress, which are inflated or deflated by a pump (e.g., of the bed's integrated pneumatic system or a pump in a pump housing mounted on the bed's footboard) to change the width of the mattress. Therefore, the change in width is achieved with the push of a control button. While the caregiver will likely unzip the cover to reconfigure the cover to accommodate the increased width (because doing otherwise would not result in the proper increased bed width as the bladders would be constricted by the cover), they can forget to adjust the cover when one or both of the expansion bladders are deflated. This can lead to the cover having excess material or slack at the sides, which can interfere with the proper use of the mattress.

SUMMARY

The present disclosure provides a patient support in the form of a mattress for supporting a patient on a bed, such as a hospital bed, and a mattress cover. The mattress and mattress cover are configured to expand and contract to accommodate larger patients, such as bariatric patients, and to return the mattress and its cover to their unexpanded configuration, or in some cases an intermediate configuration, without requiring user adjustments to the cover.

In one embodiment, the patient support includes a mattress and a mattress cover. The mattress includes a main patient support cushion with at least one sleeve at one of its opposed sides that can be configured to extend from a first configuration where the sleeve is unfilled and to a second configuration where the sleeve is filled and in an extended configuration to increase the width of the mattress. The mattress cover is configured to expand to an expanded configuration to accommodate the increased width of the mattress when the sleeve is filled. When the sleeve is no longer filled, the mattress cover is configured to automatically return to an unexpanded configuration to hold the unfilled sleeve in a stowed configuration.

In one aspect, the sleeve is sealed to form an inflatable expansion bladder and is in fluid communication with a pneumatic system to fill or remove air from the sleeve and, therefore, inflate or deflate the inflatable expansion bladder.

In a further aspect, the mattress includes at least one elastic member that extends under the main patient support cushion and is coupled to the cover to apply a biasing force to pull the cover inward from its expanded configuration toward its unexpanded configuration when the sleeve is deflated.

In one aspect, the elastic member may comprise a plurality of elastic members.

In a further aspect, each of the elastic members extends laterally under the main patient support cushion and is attached at one end at one side of the cover and attached at another end at the other side of the cover.

In yet a further aspect, the mattress further includes a plurality of guides to guide the elastic members. Further, the guides are mounted to the cover adjacent but spaced from the ends of the elastic members.

For example, in one aspect the guides may comprise one or more straps, with each strap having opposed ends that are secured at one side of the cover and a detached portion between the opposed ends forming the guide for a respective elastic member.

In another aspect, the guides may be formed from a pair of straps that extend along at least a portion of the length of the cover. Each strap is secured at one side of the cover at multiple anchor points with a respective guide being formed between pairs of anchor points.

In yet another aspect, the guides are coupled to the cover and provide stiffer regions to the cover relative to flexible regions of the cover adjacent to the guides and the stiffer regions. The stiffer regions and the flexible regions cooperatively form folds in the cover in response to contraction of the elastic members to pull the cover inward toward its unexpanded configuration. The folding action provided by the guides and the elastic members may substantially prevent formation of excess material or slack in the cover in the unexpanded configuration.

In another embodiment, the patient support includes a mattress, a mattress cover, and a pneumatic system. The mattress includes a main patient support cushion with a pair of sealed sleeves on its opposed sides to form inflatable expansion bladders that are in fluid communication with the pneumatic system, which is configured to inflate or deflate one or both expansion bladders to increase or decrease the width of the mattress. Each sleeve can be configured to extend from a first configuration where the respective sleeve is uninflated and a second configuration where the respective sleeve is filled with air and in an extended configuration to increase the width of the mattress. When one or both the sleeves are no longer filled, the mattress cover is configured to automatically return toward its unexpanded configuration and to hold the deflated sleeve or sleeves in a stowed configuration within the cover.

In a further aspect, the mattress includes at least one elastic member to bias the cover to its unexpanded configuration (or intermediate configuration) so that when one or both sleeves are deflated, the cover will automatically return towards its unexpanded configuration (including the intermediate configuration). For example, the elastic member may be coupled to opposed sides of the cover at at least one location, and optionally at at least two locations, on each opposed side of the cover.

In yet a further aspect, the at least one elastic member comprises two elastic members spaced along the length of the mattress, which extend under the mattress and are coupled to the cover to apply a biasing force to pull the cover inward from its extended configuration toward its unexpanded configuration when one or both sleeves are unfilled.

In a further aspect, each of the elastic members extend laterally under the main patient support cushion and are attached at one end to one side of the cover and attached at another end to the other side of the cover.

In yet a further aspect, the cover includes an upper cover portion and a lower cover portion, which are joined together by a zipper formed by an upper zipper half mounted to the upper cover portion and a lower zipper half mounted to the lower cover portion. Each elastic member is coupled to the lower cover portion adjacent the lower zipper half on one side of the lower cover portion and adjacent the lower zipper half on the other side of the lower cover portion.

In a further aspect, the mattress may also include a plurality of guides to guide the elastic members. For example, the guides may be mounted to the lower cover portion inward of the ends of the elastic members. Further, the guides may be spaced inward from the lower zipper portion sufficiently to allow the lower cover portion to fold between the respective end of the elastic member and the respective guide.

For example, in one aspect the guides may comprise a plurality of straps, with each strap having opposed ends that are secured to a respective side of the lower cover portion and a detached portion between the opposed ends forming the guide for a respective elastic member.

In another aspect, the guides on one side of the lower cover portion may be formed from a first strap that extends along one side of the lower cover portion and which is secured to the one side of the lower cover portion at multiple anchor points with the guides for the one side being formed between the anchor points. Similarly, the guides on the other side of the lower cover portion may be formed from a second strap that extends along the other side of the lower cover portion and which is secured to the other side of the lower cover portion at multiple anchor points with the guides on the other side being formed between the anchor points of the second strap to the other side of the lower cover portion.

In another embodiment, the patient support includes a mattress, a mattress cover, and a pneumatic system. The mattress includes inner and outer sealed sleeves at each side of the main patient support cushion, and each sleeve is in fluid communication with the pneumatic system, which is configured to inflate or deflate the outer sleeves to form expansion bladders together or independently to increase the width of the mattress by one inflated expansion bladder or two inflated expansion bladders or decrease the width by deflating one or both expansion bladders. The cover is configured to expand from an unexpanded configuration to an expanded configuration to accommodate the increased widths of the mattress. The mattress further includes at least one elastic member that extends under the main patient support cushion and is coupled to the cover to apply a biasing force to pull the cover inward toward the inner sleeves when one or both expansion sleeves are deflated.

In one aspect, the cover forms one or more folds when pulled toward its unexpanded configuration.

In any of the above, the main patient support cushion may include a plurality of inflatable bladders.

In any of the above, the elastic members may be elastic straps. Optionally the straps may have generally rectangular cross-sections.

In any of the above, the expansion bladders when inflated may form bolster bladders that are inflated to a higher pressure or firmness than the remainder of the mattress.

In any of the above, the elastic strap or straps may be adjustable and/or removable. For instance, the length of each elastic strap may be shortened to counteract an increase in length due to fatigue and a resulting reduction in tension.

In any of the above, the cover may be formed from a material, such as nylon and coated with polyurethane, including high endurance polyurethane. When employing multiple elastic straps, the ends of the elastic straps may be anchored to the cover via stitching or welding. When employing one elastic member, the elastic member may be laced from one side of the cover across to the other side of the cover and coupled to each side of the cover using loops that are welded or otherwise adhered to the cover. Optionally the ends of the one elastic member may extend from one end or side of the cover to allow a caregiver to pull on the ends to adjust the elastic member.

Before the embodiments of the disclosure are explained in more detail below, it is to be understood that the disclosure is not limited to the details of operation or to the details of construction and the arrangement of the components set forth in the following description or illustrated in the drawings. The disclosure may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the disclosure to any specific order or number of components. Nor should the use of enumeration be construed as excluding from the scope of the disclosure any additional steps or components that might be combined with or into the enumerated steps or components.

DETAILED DESCRIPTION

Figure 1:
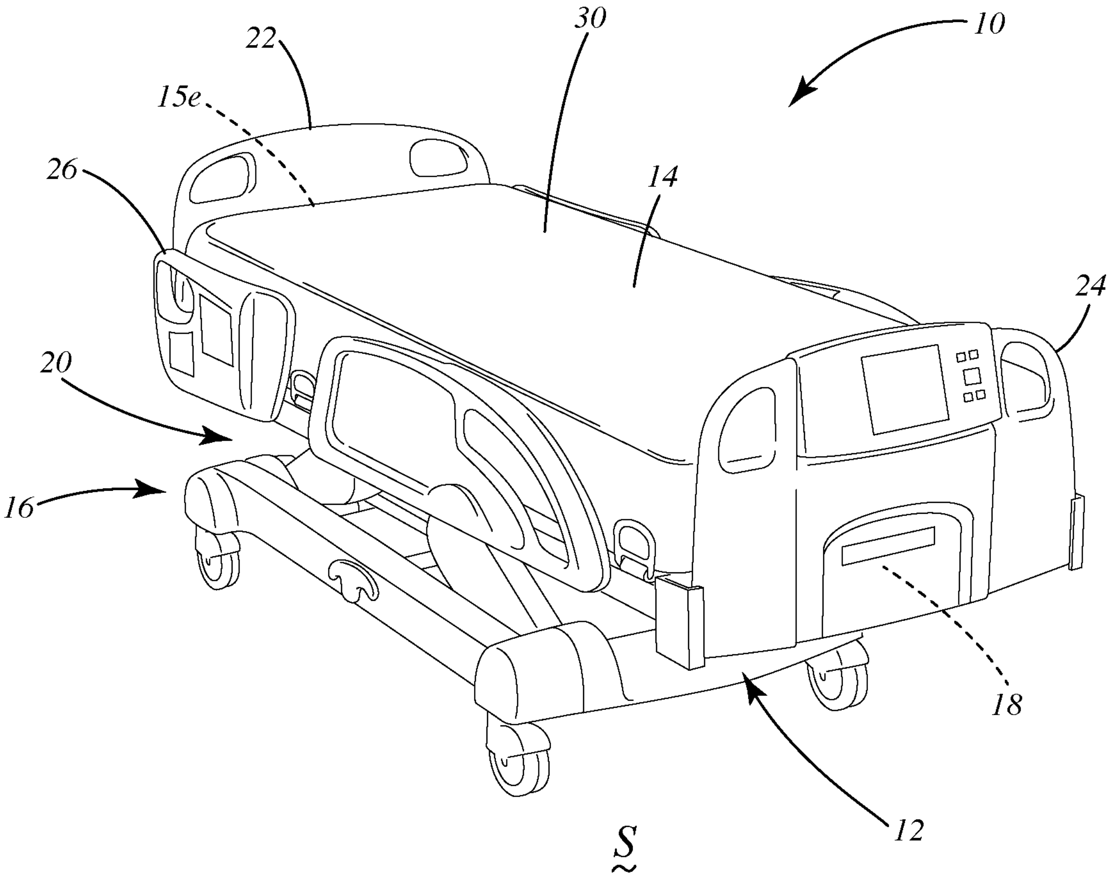
FIG. 1 is a perspective view a patient support and cover shown mounted to a patient support apparatus, for example, a hospital bed.

Referring to FIG. 1, the numeral 10 generally designates a patient support. While described as a "patient" support, it should be understood that "patient" is to be construed broadly to include not only people undergoing medical treatment but also invalids and other persons, such as long term care persons, who may or may not be undergoing medical treatment. Further, while patient support 10 is illustrated as a mattress, it will be understood that patient support 10 may take on other forms, such as pads, cushions, including cushions for wheelchair or stationary chair pads. The patient support 10 provides support to a patient's body and, further, may be adapted to provide therapy or treatment to the patient, for example, rotation therapy, percussion therapy, or vibration therapy or the like, as described in the referenced applications.

Referring again to FIG. 1, the patient support 10 is supported on a patient support apparatus 12 that, in this particular embodiment, is illustrated as a hospital bed. However, the patient support apparatus 12 may take on other forms besides hospital beds, such as, but not limited to, long term care, cots, stretchers, operating tables, gurneys, and the like. Further, the patient support apparatus 12 may be a conventional support apparatus that is commercially available and that merely provides a supporting function for the patient support 10. As will be more fully described below, the patient support 10 comprises a mattress that can be increased in size to accommodate persons of greater height and/or width, for example, a bariatric person or patient.

The patient support apparatus 12 may include one or more controls that are integrated therein and which are used in controlling one or more functions of the patient support 10, including a bed control system and a pneumatic system for inflating or deflating portions of, or the entire mattress cushioning system, more fully described below. For example, the patient support apparatus 12 may have one or more user interfaces that are positioned on, or integrated into, the barrier of the patient support apparatus 12. The user interface may take on a variety of different forms, such as, but not limited to, a touch screen, a Liquid Crystal Display (LCD), a plurality of buttons, switches, knobs, or the like, or any combination of these components, which allows a user to control the operation of the patient support 10, including in some embodiments, adjusting the width of the mattress. A suitable control system for the patient support apparatus may include wired or wireless communication, such as disclosed in commonly assigned U.S. patent application Ser. No. 13/802,992, filed Mar. 14, 2013 by applicants Michael Hayes et al., and entitled COMMUNICATION SYSTEMS FOR PATIENT SUPPORT APPARATUSES, the complete disclosure of which is hereby incorporated herein by reference. A suitable pneumatic system for controlling one or more pneumatic components of the mattress, for example, to increase or decrease the width of the mattress, is described in U.S. patent application Ser. No. 18/009,110 entitled PATIENT SUPPORT SYSTEM INCLUDING EXPANDABLE PATIENT SUPPORT AND CONTROL ASSEMBLY WITH DISPLAY HAVING ANIMATIONS FOR INSTRUCTING A USER, filed on Dec. 8, 2022, claiming the benefit of U.S. Provisional Patent Application No. 63/084,806, filed on Sep. 29, 2020, and U.S. patent application Ser. No. 18/009,105 entitled PATIENT SUPPORT SYSTEM INCLUDING EXPANDABLE PATIENT SUPPORT AND CONTROL ASSEMBLY, filed on Dec. 8, 2022, claiming the benefit of U.S. Provisional Patent Application No. 63/084,808, filed on Sep. 29, 2020, all commonly owned by Stryker Corporation, of Kalamazoo, Michigan, the entire contents and disclosure of which are hereby incorporated by reference in their entireties.

For more exemplary details of a suitable hospital bed construction, reference is made to the beds described in U.S. Pat. Nos. 8,006,332; 7,690,059; 7,805,784; 7,962,981; and 7,861,334, all commonly owned by Stryker Corporation of Kalamazoo, Michigan, which are herein incorporated by reference in their entireties.

Referring again to FIG. 1, the patient support apparatus 12 includes a mattress 14, which forms the patient support surface and which is supported on a deck 18, and a wheeled base 16. The base 16 includes a lift mechanism 20, which supports a frame (not shown) for the supporting deck 18, for raising the frame and deck 18 relative to the base 16 and a floor surface S. The patient support apparatus 12 also includes one or more barriers, such as a headboard 22, a footboard 24, and side rails 26, which are either mounted to the frame supporting deck 18 or to the deck 18 itself. In the illustrated embodiment, the side rails 26 are mounted to the deck 18 so that when the head section (often referred to as the Fowler) of the deck 18 is raised, the head end side rail will move with the deck 18 and form a barrier to the patient even when the patient is in a seated or elevated position. As will be more fully described below, the patient support surface area, which is defined by the mattress 14, is adjustable so that it can accommodate wider and/or taller patients, for example, bariatric patients.

Figure 1A:
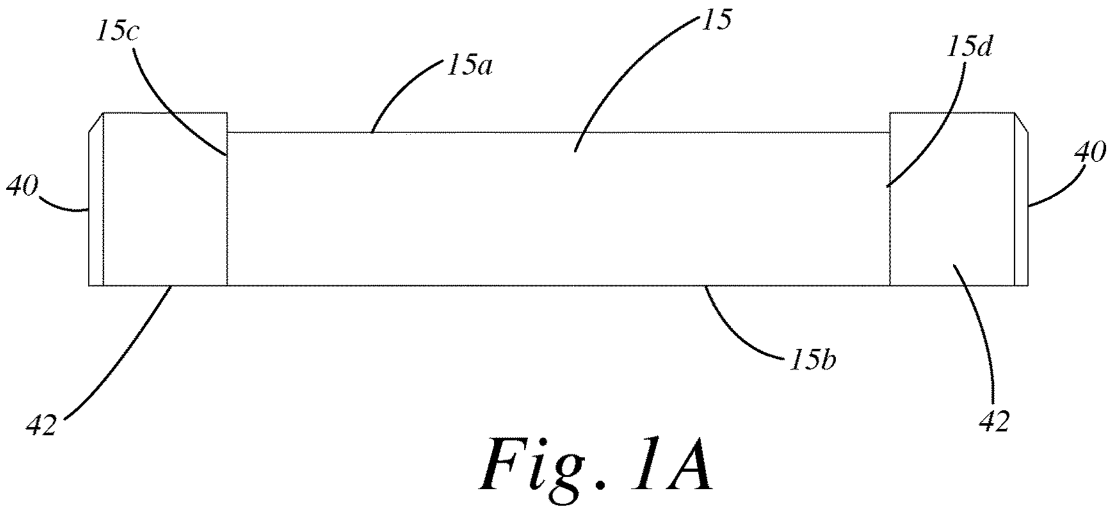
FIG. 1A is a schematic drawing of the patient support with the cover removed.
Figure 1B:
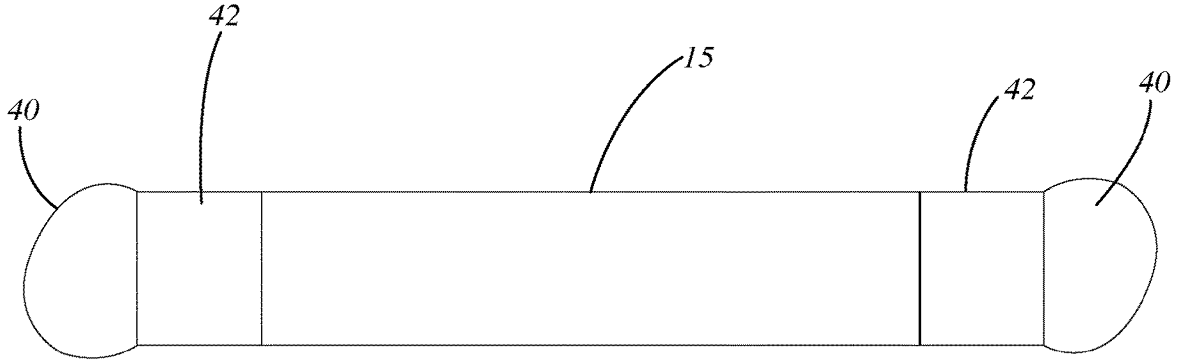
FIG. 1B is a schematic drawing of the patient support with the cover removed illustrating the patient support with an increased width.

Referring to FIGS. 1A and 1B, the mattress 14 is formed by a main patient support cushion 15. The main support cushion 15 includes a top surface 15*a*, a bottom surface 15*b*, as well as longitudinal sides 15*c*, 15*d* and lateral sides 15*e*, 15*f* (see FIGS. 1 and 2). Suitable cushioning material for the main patient support cushion includes an inflatable cushion formed from a plurality of inflatable bladders (which are in fluid communication with the pneumatic system); foam, such as polyurethane foam, memory foam, viscoelastic foam, including gel viscoelastic foam, neoprene foam, or polyurethane foam; or gel, or a combination thereof. The width of the mattress, and hence the patient support surface area, may be increased by sleeves 40, which are located along the longitudinal sides 15*c*, 15*d* or along the sides of optional inner sleeves 42. The sleeves 40 and/or 42 may be open for receiving inserts to provide bolsters and/or expansion bladders, or may be sealed to form inflatable bladders (and also, therefore, in fluid communication with the pneumatic system). For an example of suitable inserts reference is made to U.S. patent application entitled SUPPORT APPARATUS FOR BARIATRIC PERSON, application Ser. No. 16/916,898, filed on Jun. 30, 2020, and commonly owned by Stryker Corporation, of Kalamazoo, Michigan, which is incorporated by reference herein in its entirety.

The inner sleeves 42 may be configured as bolster bladders and then reconfigured to form an extension of the main patient support cushion when the sleeves are filled either with inserts or air, as described in the above reference applications.

As will be more fully described below, to accommodate the change in width of the mattress, but also to retain a relatively snug fit or at least reduce excess material, the cover 30 is configured to expand to one or more expanded configurations or retract to or toward an unexpanded configuration without the need for caregiver adjustment. For example, as described below, one or both of the outer sleeves 40 on the opposed sides may be filled so that the mattress can be expanded from its regular unexpanded width (e.g., 36") to an intermediate width (e.g., 42") or a fully extended width (e.g., 48" or 56").

Referring again to FIGS. 1A and 1B, each outer sleeve 40 is selectively reconfigured between a stowed configuration or state (FIG. 1A) wherein the sleeve is unfilled and extends along the longitudinal side of the main cushion 15, and is closely adjacent the respective longitudinal side of the main cushion 15 (or the inner sleeve 42 as noted), and an expanded configuration or state wherein the sleeve is filled to form an extension of the top surface of the main cushion 15 to thereby increase the support surface of the mattress.

In the illustrated embodiment, there are two outer sleeves 40, each extending the full length of each longitudinal side 15*c*, 15*d*; however, it should be understood that a single sleeve may be provided on one side, or two or more sleeves may be provided at each longitudinal side. Although described herein in reference to a mattress, it should be understood that the sleeves may be used in connection with other types of pads or cushions, as noted above. Further, although not illustrated, the length of the mattress 14 may be similarly extended by locating one or more sleeves at the head end and/or foot end of the main cushion 15. Additionally, the sleeve or sleeves may extend only partially along the longitudinal length of the main cushion.

When in their expanded configuration, sleeves 40 are optionally filled with air via the pneumatic system noted above. Alternately, they may be partially or fully filled with a foam insert or inserts. Thus, when filled, the support surface is extended beyond the perimeter of the main patient support surface cushion of the mattress, such as in the lateral direction, to provide an extended support surface for a portion of a person's body that may exceed or go beyond a conventional mattress, for example, in the case of a bariatric person, as noted this may include an increase to 42" or 48" (or 54"). Other widths may also be provided. Optionally, as noted the sleeves may be sized and shaped and inflated so that the extended support surface is higher than and/or stiffer than the main patient support cushion to form a barrier on either side of the mattress, which can help with reducing falls from the mattress. In this manner, the filled sleeves may form "bolsters".

As best seen in FIG. 1A, when in its stowed configuration, the respective sleeve 40 may collapse and/or fold against a respective longitudinal side 15*d* (or 15*c*) of the main cushion 15 or inner sleeve 42 and held in its stowed configuration, by cover 30, as described below.

Figure 2:
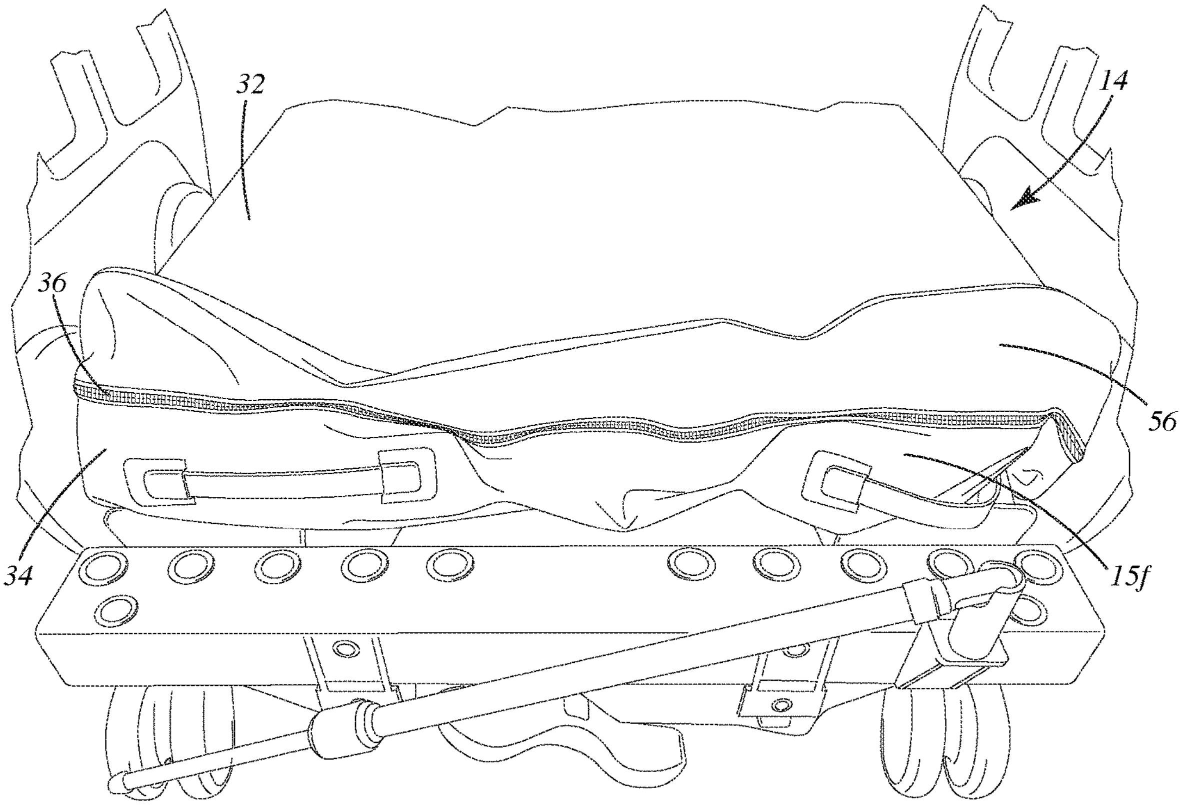
FIG. 2 is an end enlarged perspective view of the patient support and cover of FIG. 1.
Figure 3:
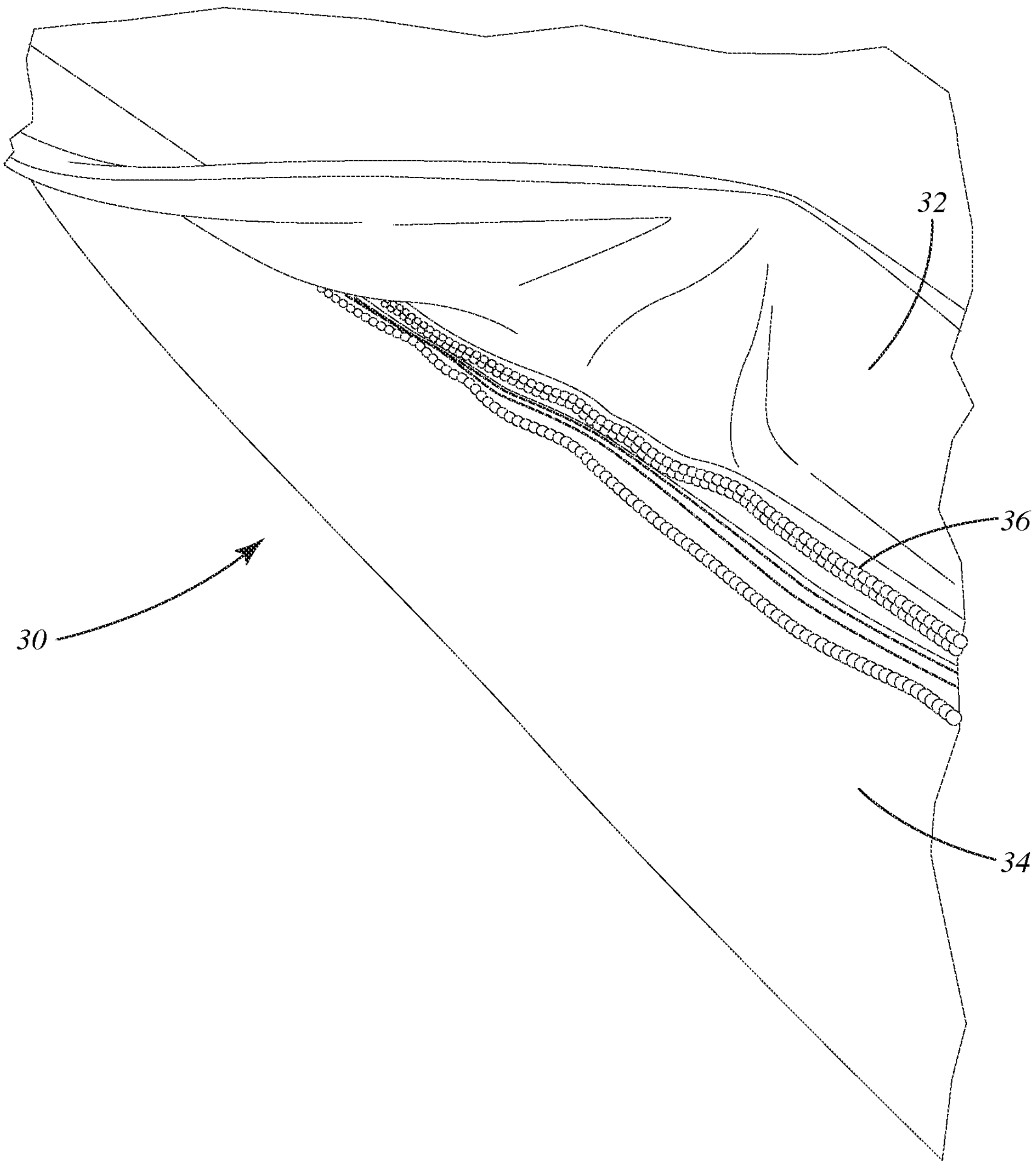
FIG. 3 is an enlarged side perspective view of the patient support and cover of FIG. 2.

Referring to FIGS. 2 and 3, the cover 30 includes an upper cover portion 32 and a lower cover portion 34 that are joined together at a seam by a perimeter zipper 36, such as a full perimeter zipper or partial perimeter zipper, to facilitate removal for cleaning or replacement of the cover from the main cushion forming the mattress. The upper and lower portions 32, 34 of the cover 30 may be joined by a seam formed by stitching so that the upper cover portion 32 is not completely detachable from the lower cover portion 34, and with the remainder of the upper and lower portions 32, 34 of the cover 30 joined with a partial perimeter zipper, i.e., a zipper that extends only around a portion of the perimeter of the main patient support cushion 15. The location of the zipper may vary, but in the illustrated embodiment is located along longitudinal 15*c*, 15*d* and lateral sides 15*e* (FIG. 2), 15*f* (FIG. 1) between the top and lower sides 15*a*, 15*b* of the main patient support cushion 15 and, optionally, about midway between the top and lower sides 15*a*, 15*b* of the main patient support cushion 15.

It should be understood that construction of the cover 30 may vary. For example the upper and lower portions 32,34 may each be formed by a single panel or may be assembled from more than one panel, which are welded together or stitched together—though to reduce possible paths of fluid ingress constructing the cover portions from single panels will reduce the number of possible paths of fluid ingress.

To accommodate the increase in width in the cushioning system, for example, when one of the expansion sleeves is filled, such as by inflation, the cover 30 is configured to expand to accommodate the increased width of the mattress and to contract once the sleeve or sleeves are no longer filled to return the cover 30 to its unexpanded configuration, or in some cases an intermediate configuration, without requiring caregiver adjustments to the cover. Stated another way, when the sleeve or sleeves are no longer filled, the mattress cover is configured to automatically return to its unexpanded configuration and further to hold the unfilled sleeve in a stowed configuration. Optionally, the same or similar elastic tensioning system could be attached to the mattress itself (e.g., the sleeves) to better manage the mattress and keep the mattress in a more compact configuration when the sleeves are deflated.

Figure 4:
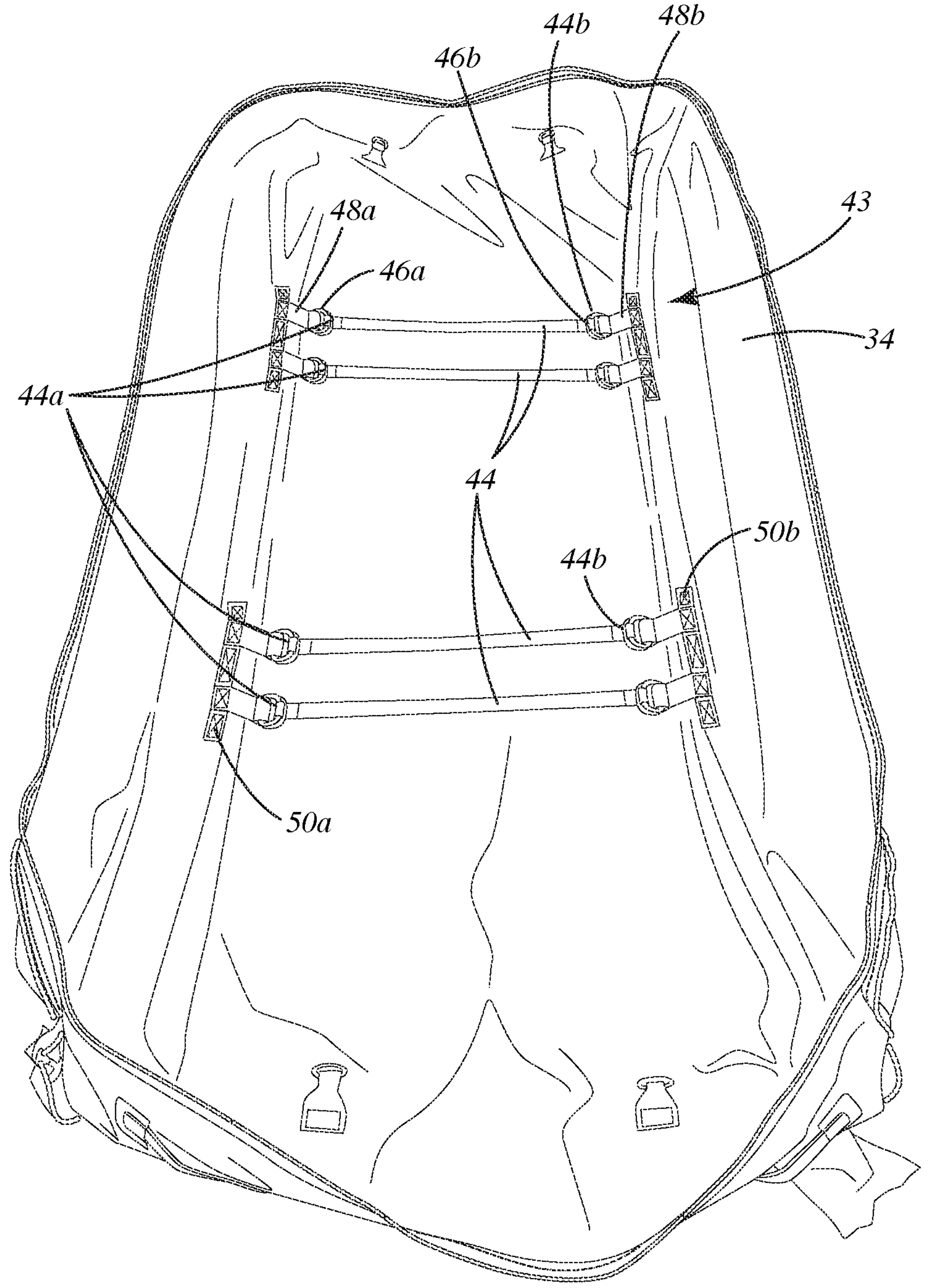
FIG. 4 is top perspective view of the cover with the upper cover half removed to illustrate the elastic members that help retain the cover in an unexpanded configuration.

For example, as best seen in FIG. 4, the mattress 14 includes an elastic tensioning system 43 comprising at least one elastic member 44 that extends under the main patient support cushion 15 (as understood from FIG. 4) and is coupled to the cover 30 to apply a biasing force to pull the cover inward from its expanded configuration toward its unexpanded configuration when one or both sleeves are deflated.

For example, as shown, a plurality of elastic members 44 may be used and further may be arranged in groups. In the illustrated embodiment, each strap end 44*a*, 44*b* may be coupled to opposed sides of the cover 30. Further, each of the elastic members 44 extends laterally under the main patient support cushion and is attached at one end 44*a* at one side of the cover 30 via a coupler 46*a*, such as a D ring, and attached at another end 44*b* at the other side of the cover by another coupler 46*b*, also optionally a D ring. The couplers 46*a*, 46*b* may be attached or mounted to the cover directly, such as by welding, stitching or the like, or via straps 48*a*, 48*b*, which in turned are mounted to the cover via stitching or welding or the like either directly or over reinforcement straps 50*a*, 50*b*.

Reinforcement straps 50*a*, 50*b* may distribute the load across a greater surface area and also may provide local stiffness to the cover relative to flexible regions of the cover adjacent or surrounding to the straps (and the stiffer regions), which can facilitate folds forming in the cover when the cover is free to retract to its unexpanded (or intermediate) configuration. In other words, the stiffer regions and the flexible regions cooperatively form folds in the cover in response to contraction of the elastic members to pull the cover inward toward its unexpanded configuration. The folding action provided by the straps and the elastic members may substantially prevent formation of excess material or slack in the cover in the unexpanded configuration.

Thus, when the sleeves 40 are sealed to form expansion bladders and are selectively inflated by the pneumatic system based on input from the caregiver (e.g., at the user interface), the mattress width is increased and elastic members 44 stretch to allow the cover to expand but apply a tension force on the cover. When one or both expansion bladders are deflated to decrease the width of the mattress, the tension force will pull the cover inwardly. The mattress cover is thus configured to automatically return toward its unexpanded configuration and to hold the deflated sleeves in their stowed configuration within the cover.

Figure 5:
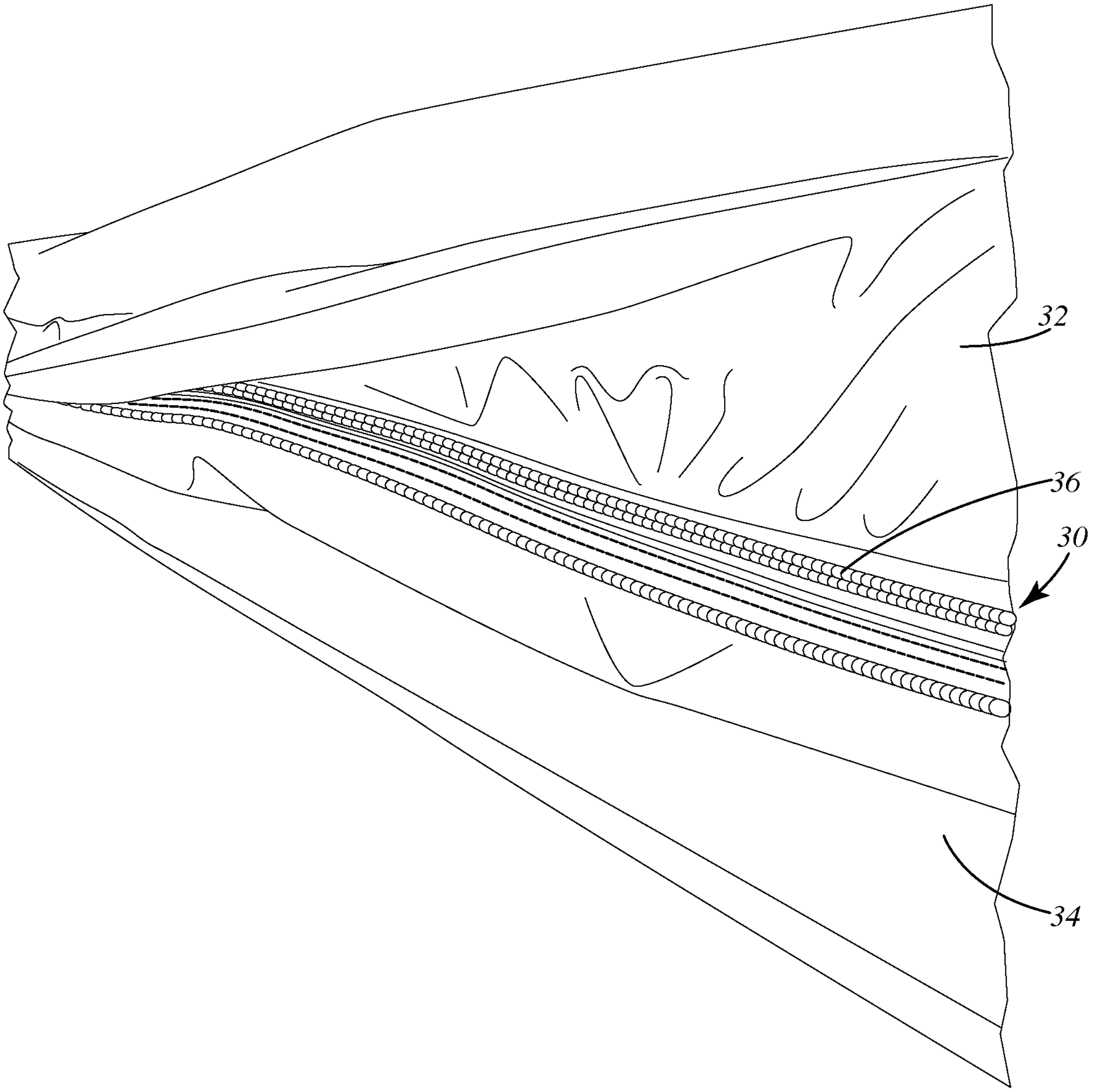
FIG. 5 is an enlarged side perspective view of the patient support and another embodiment of the cover of FIG. 2.
Figure 6:
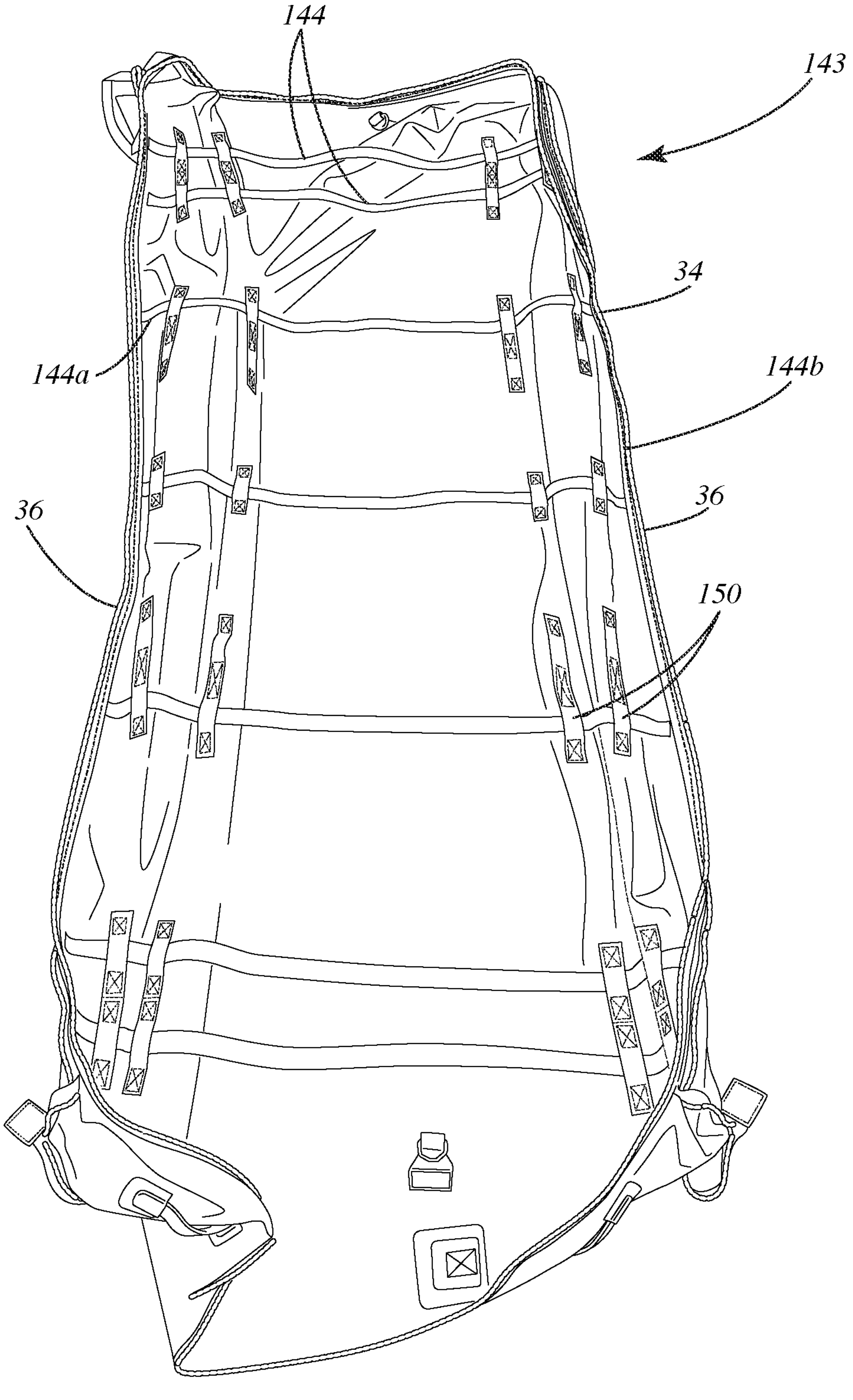
FIG. 6 is top perspective view of the cover of FIG. 5 with the upper cover portion removed to illustrate the elastic members that help retain the cover in an unexpanded and folded configuration shown in FIG. 5.

Referring to FIGS. 5 and 6, the cover 30 may include another embodiment of an elastic member tensioning system 143, which also includes a plurality of elastic members 144, but which are mounted to the cover in a way to enhance the folding function of the cover when returned to its unexpanded configuration.

Figure 7:
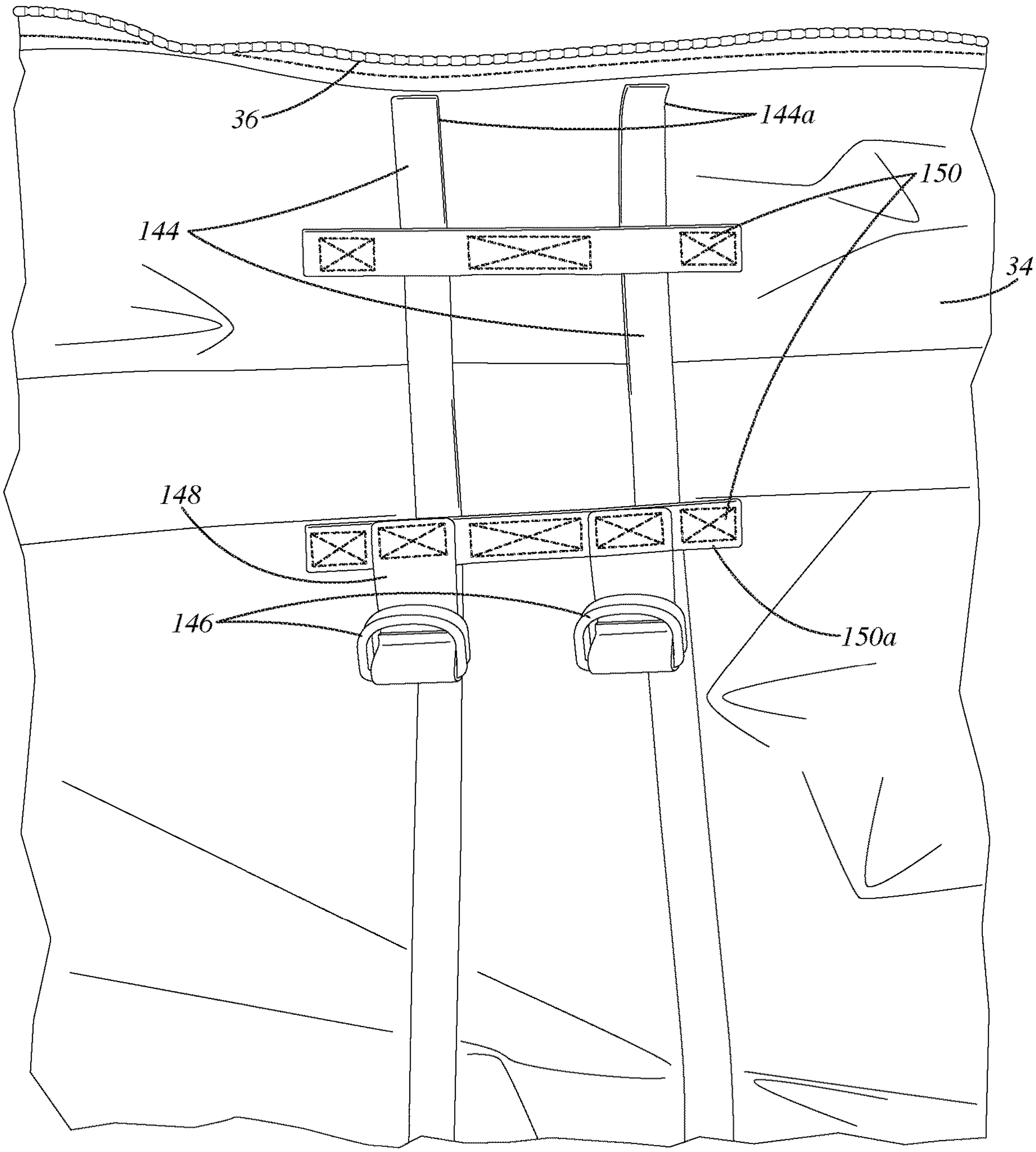
FIG. 7 is an enlarged view of the end of two of the elastic members and their mounting arrangement shown in FIG. 6 to the cover with optional adjustment mechanisms.

As best seen in FIGS. 6 and 7, the elastic members 144 are directly mounted to the cover 30. Each end 144*a*, 144*b* is mounted, for example, via stitching, welding or the like to the lower cover portion 34 adjacent zipper 36. Similar to the elastic tensioning system 43, each of the elastic members 44 extends laterally under the main patient support cushion and, further, is guided by one or more guides 150 spaced inwardly from their respective ends 144*a*, 144*b*. In the illustrated embodiment, each end 144*a*, 144*b* is guided by a pair of guides 150.

The guides 150 may be formed by a strap 150*a*, with each strap 150*a* having opposed ends that are secured at the respective side of the cover (e.g., via stitching, welding, or the like) and a detached portion between the opposed ends forming the guide for a respective elastic member. Optionally, a strap may form two or more guides, for example, for adjacent elastic members. When forming two guides, for example, for two adjacent elastic members, each strap 150*a* may also include an intermediate portion secured the cover, with the guides formed between the detached portions between the intermediate potions and the respective end of the strap.

As best seen in FIG. 6, the guides 150 are arranged in groups of two or more to provide two or more spaced apart guides for each elastic member at each portion of the elastic member that traverses inside the side of the cover (the portion of the cover that forms the side of the cover when closed and fitted around the mattress and which coincides with the sides of the mattress). The guides 150 are also arranged along parallel axes that are spaced from each other and parallel to the side 15*c*, 15*d* of main patient support cushion. Additionally, the guides 150 are formed from straps that are stitched or welded or the like to the cover 30. The straps are formed by webbing that are relatively stiff compared to the cover material and provide localized stiffness to cover 30 so that when secured, such as by sewing, gluing, or welding, they form folding axes for the cover when the elastic members pull on the sides of the cover and the cover is no longer encumbered by the filled sleeve or sleeves, e.g., inflated expansion bladder or bladders. The stiffness can also be provided by stiffer material strips or pads welded, sewn, or inserted into a sleeve attached to the side, as well or instead of the stiffness provided by the straps. Stated another way, the guides are coupled to the cover and provide stiffer regions to the cover relative to flexible regions of the cover adjacent to the guides (and the stiffer regions). The stiffer regions and the flexible regions cooperatively form folds in the cover in response to contraction of the elastic members to pull the cover inward toward its unexpanded configuration. The folding action provided by the guides and the elastic members may substantially prevent formation of excess material or slack in the cover in the unexpanded configuration.

Optionally, each strap 150*a* may form more than two guides and optionally extend the length of the cover to straddle all the elastic members. In other words, each group of aligned guides may be formed from a single strap mounted to the cover at spaced intervals with the guides formed between the connections to the cover.

Figure 8:
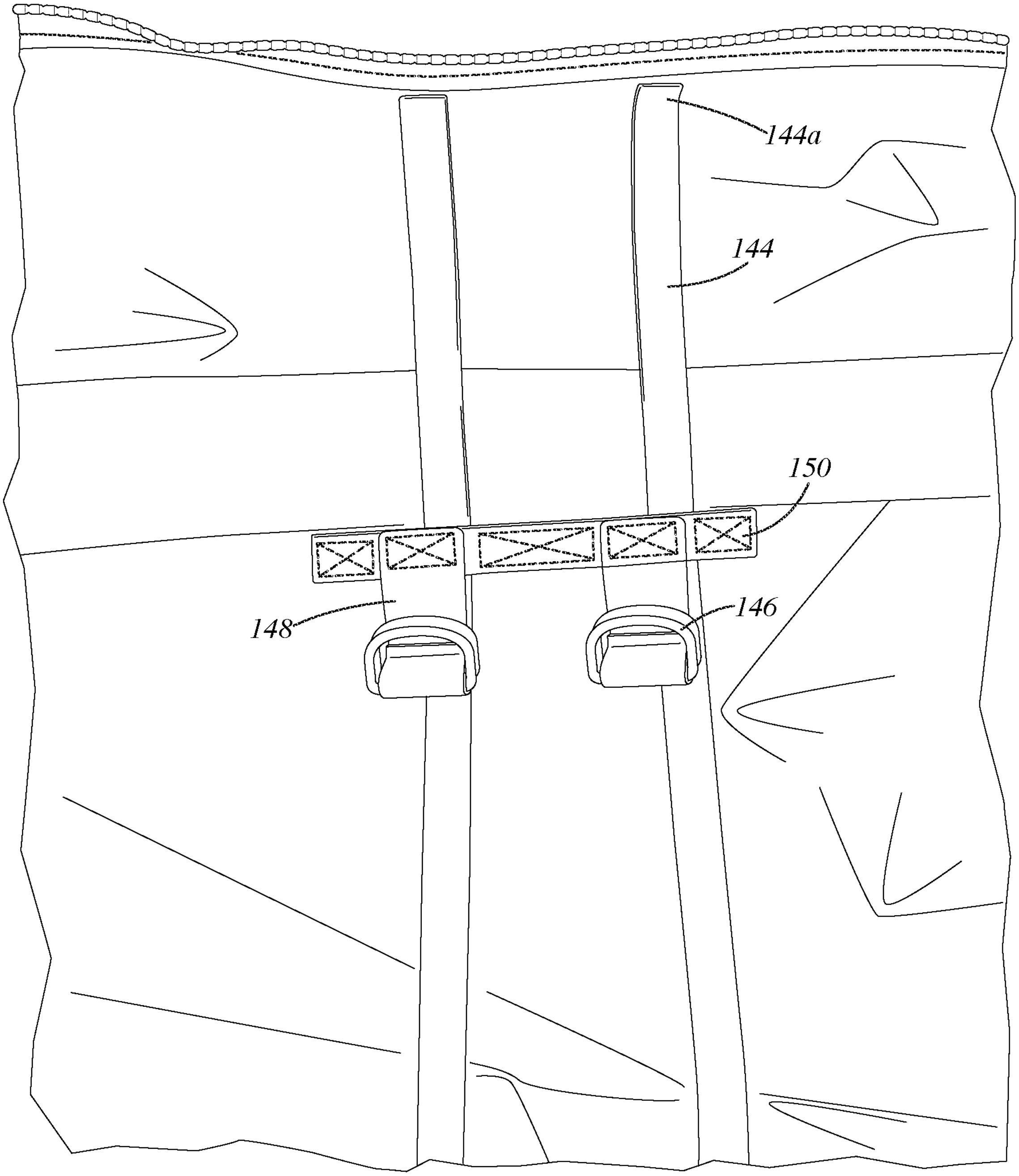
FIG. 8 is an enlarged view of the end of two of the elastic members and an alternate mounting arrangement to the cover.

In addition, as best seen in FIG. 8, each elastic member 144 may have an adjustment mechanism associated therewith to adjust the tension in the respective elastic member. For example, couplers 146, such as D rings, may be secured to the guides through which the elastic member may be threaded and to compensate for lost elasticity, which can occur over time.

Figure 9:
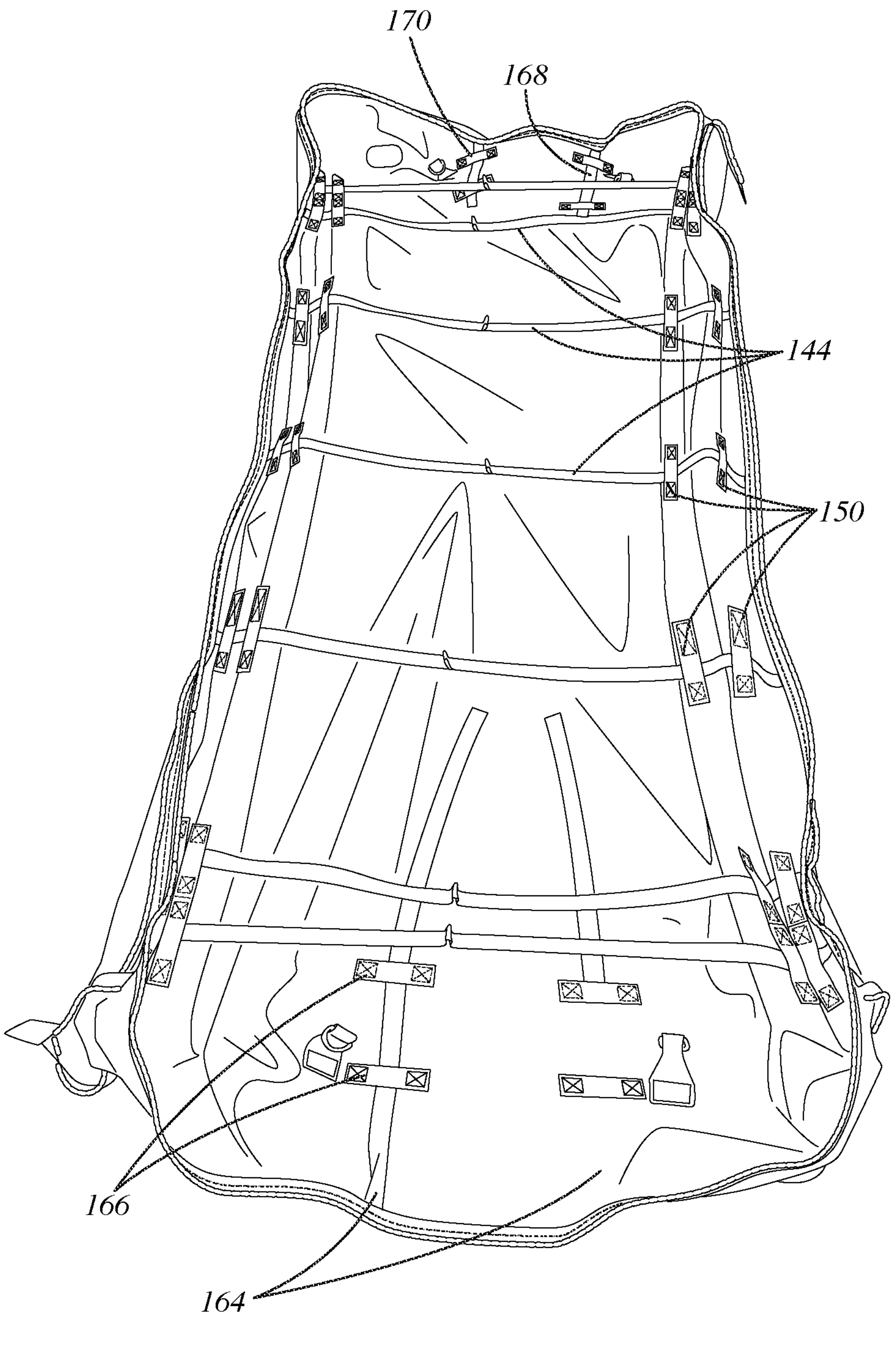
FIG. 9 is top perspective view of the cover of FIG. 6 with additional the elastic members at the head end and foot end of the lower cover portion.

Referring to FIG. 9, the cover 30 may also include additional elastic members at the head end and/or foot end to help manage the excess material. For example, one or more head end elastic members 164 may be secured at one of their ends to the cover adjacent the zipper (at the head end) and at their opposed ends to the cover spaced inwardly from the head end. The members 164 may also be guided by guides 166, similarly formed from straps, as described above, which are mounted to cover at spaced locations along the cover. In this embodiment the elastic members are arranged so they extend longitudinally along the cover (along the long axis of the cover).

Similarly, one or more foot end elastic members 168 may be secured at one of their ends to the cover adjacent the zipper (at the foot end) and at their opposed ends to the cover spaced inwardly from the foot end. The members 168 may also be guided by guides 170, similarly formed from straps, as described above, which are mounted to cover at spaced locations along the cover. Similar to head end members, the elastic members 168 are arranged so they extend longitudinally along the cover (along the long axis of the cover). For further details of the elastic members and guides reference is made above and below.

Optionally, as noted, the mattress may include an inner sealed sleeve 42 and an outer sealed sleeve 40 at each side of the main patient support cushion 15, with each sleeve in fluid communication with the pneumatic system, which is configured to inflate or deflate the outer sleeves to form expansion bladders together or independently to increase the width of the mattress. The pneumatic system may inflate one expansion bladder or two expansion bladders or decrease the width by deflating one or both expansion bladders. Further, as described in the above referenced applications, the inner sleeves may be configured as bolster bladders (e.g., either extend higher than the main patient support cushion 15 or have a greater stiffness (e.g., higher pressure) than the main patient support cushion or both. When the extension bladders are inflated, the inner sleeves may be adjusted so that they provide the same cushioning (stiffness and same height of the main patient support cushion) so that they become an extension of the patient support surface, and the outer sleeves then become the bolsters.

Alternately both the inner and outer sleeves may be inflated to provide the same stiffness and height as the main patient support cushion so as to extend the patient support surface across the full width of the mattress.

In any of the above, as noted, the main patient support cushion may include a plurality of inflatable bladders.

In any of the above, the elastic members may be elastic straps. Optionally the straps may have generally rectangular cross-sections or may be round or rounded. For example, the elastic straps may be rubberized material, rubber material, or have a rubber core surrounded by fabric, or other suitable elastic straps.

In any of the above, the expansion bladders when inflated may form bolster bladders that are inflated to a higher pressure or firmness than the remainder of the mattress.

In any of the above, the elastic strap or straps may be adjustable and/or removable using rings, such as D rings, or other suitable strap adjustment devices. For instance, the length of each elastic strap may be shortened to counteract an increase in length due to fatigue and a resulting reduction in tension.

In any of the above, the cover may be formed from a material, such as nylon and coated with polyurethane, including high endurance polyurethane. When employing multiple elastic straps, the ends of the elastic straps may be anchored to the cover, as noted via stitching or welding.

In any of the above the straps may be formed from coated webbing.

When employing one elastic member, the elastic member may be laced from one side of the cover across to the other side of the cover and coupled to each side of the cover using loops that are welded or otherwise adhered to the cover. Optionally the ends of the one elastic member may extend from one end or side of the cover to allow a caregiver to pull on the ends to adjust the elastic member.

The height and/or the cross-section shape of the sleeves 40 may be varied. For example, as noted, the sleeves may be filled so that they have a height so that it forms a support surface higher than the support surface of the main cushion—this way it can act as a barrier and help prevent people from falling off the mattress. In the illustrative embodiment, the shape of the cross-section of the sleeves when inflated are generally rounded on its outer side and as noted may extend above the main patient support cushion 15 and/or sleeves 42.

To protect the zipper 36 from liquid intrusion, the cover 30 may include a flap 56, which may be formed from a folded over piece of fabric, such as shown in FIG. 2. As noted, the zipper 36 may extend around the full perimeter of the perimeter walls of the cover 30 or may extend only alongside some of the covers' sides. The location of the zipper may vary, but in the illustrated embodiment is located along longitudinal and lateral sides or side panels of the cover 30 and, optionally, about midway between the upper and lower panels of the cover 30.

To expand the width of the mattress, a caregiver may use input controls, which control the pneumatic system, to inflate one or both expansion bladders formed by sleeves 42. As the expansion bladder or bladders inflate, they will apply pressure to the side of the cover pulling on the elastic member or members and allowing the cover to expand.

Thus, eliminating the additional zipper, the cover will have reduced pathways for liquid intrusion. Further, the caregiver will no longer need to reconfigure the cover to its unexpanded configuration. However, it should be understood that the elastic tensioning systems described herein can be used in conjunction with the additional zipper sections noted above, with the elastic tensioning systems eliminating the need for the caregiver to fold the excess material.

Optionally, the cover 30 may include straps attached thereto, e.g., by stitching, including reinforcing patches, to form handles or pull straps. The location may vary, but in the illustrated embodiment are provided on the lower cover portion 34 inward of the cover sides and end. Further, these handles or pull straps may be placed so that they too can help form the fold axes for the cover.

Although described herein in reference to a mattress, it should be understood that the cover and sleeves described herein may be used in connection with other types of cushions. Further, although not illustrated, the length of the mattress and the cover may similarly be extended by locating one or more sleeves at the head end and/or foot end of the main cushion. Additionally, the sleeve or sleeves may extend only partially along the longitudinal length of the main cushion.

As noted, although described as using zippers, Velcro strips and/or snaps, or other fasteners may be used to secure the cover portions together. Further, the location of the fasteners may vary.

Directional terms, such as "left", "right", "vertical," "horizontal," "top," "bottom," "upper," "lower," "inner," "inwardly," "outer" and "outwardly," are used to assist in describing the embodiments based on the orientation of the embodiments shown in the illustrations. The use of directional terms should not be interpreted to limit the disclosure to any specific orientation(s).

The above description is that of current embodiments of the disclosure. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all embodiments of the disclosure or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present disclosure is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

While several forms have been shown and described, other changes and modifications will be appreciated by those skilled in the relevant art. Therefore, it will be understood that the embodiments shown in the drawings and described above are merely for illustrative purposes and are not intended to limit the scope of the disclosure which is defined by the claims which follow as interpreted under the principles of patent law including the doctrine of equivalents.

The invention claimed is:

1. A patient support comprising:

a mattress; and a mattress cover, the mattress including a main patient support cushion with at least one sleeve at one of its opposed sides that is configured to extend from a first configuration where the sleeve is unfilled and to a second configuration where the sleeve is filled and in an extended configuration to increase a width of the mattress, wherein the mattress cover is configured to expand to an expanded configuration to accommodate the increased width of the mattress when the sleeve is filled, and when the sleeve is no longer filled, the mattress cover is configured to automatically return to an unexpanded configuration to hold the unfilled sleeve in a stowed configuration; and wherein the mattress includes at least one elongate member that extends under the main patient support cushion, wherein the at least one elongate member is attached at one end at a first side of the mattress cover and attached at another end at a second side of the mattress cover opposite the first side, and wherein the at least one elongate member is coupled to the mattress cover to apply a biasing force to pull the first and second sides of the mattress cover inward from the expanded configuration toward the unexpanded configuration when the sleeve is deflated thereby biasing the first and second sides of the mattress cover automatically toward each other to pull the cover inward underneath the main patient support cushion to prevent formation of excess material simultaneously at both the first and second sides of the mattress cover.

2. The patient support according to claim 1, further comprising a pneumatic system, and wherein the sleeve is sealed to form an inflatable expansion bladder and is in fluid communication with the pneumatic system to fill or remove air from the sleeve to thereby inflate or deflate the inflatable expansion bladder.

3. The patient support according to claim 1, wherein the at least one elongate member comprises at least one elastic member.

4. The patient support according to claim 3, wherein the elastic member comprises a plurality of elastic members.

5. The patient support according to claim 4, wherein the mattress further includes a plurality of guides to guide the elastic members.

6. The patient support according to claim 5, wherein:

the guides are mounted to the mattress cover adjacent but spaced from ends of the elastic members; and the guides comprise a plurality of straps, with each strap having opposed ends that are secured at one side of the mattress cover and a detached portion between the opposed ends forming the guide for a respective elastic member.

7. The patient support according to claim 5, wherein:

the guides are formed from a pair of straps that extend along at least a portion of a length of the mattress cover, with each strap secured at one side of the mattress cover at multiple anchor points with a respective guide being formed between pairs of anchor points; and the guides are coupled to the mattress cover and provide stiffer regions to the mattress cover relative to flexible regions of the mattress cover adjacent to the guides and the stiffer regions, with the stiffer regions and the flexible regions cooperatively forming folds in the mattress cover in response to contraction of the elastic members to pull the mattress cover inward toward the unexpanded configuration, wherein the folding action provided by the guides and the elastic members are configured to substantially prevent formation of excess material or slack in the mattress cover in the unexpanded configuration.

8. A patient support comprising:

a mattress;

a mattress cover;

a pneumatic system;

the mattress including a main patient support cushion with a pair of sealed sleeves on its opposed sides to form inflatable expansion bladders that are in fluid communication with the pneumatic system, which is configured to inflate or deflate one or both expansion bladders to increase or decrease a width of the mattress; and each sleeve being configured to extend from a first configuration where the sleeve is uninflated to a second configuration where the sleeve is filled with air and in an extended configuration to increase the width of the mattress, wherein one or both of the sleeves are no longer filled, the mattress cover is configured to automatically return toward an unexpanded configuration and to hold the deflated sleeve or sleeves in a stowed configuration within the mattress cover; and wherein the mattress includes at least one elongate member that extends under the main patient support cushion, wherein the at least one elongate member is attached at one end at a first side of the mattress cover and attached at another end at a second side of the mattress cover opposite the first side, and wherein the at least one elongate member is coupled to the mattress cover to apply a biasing force to pull the first and second sides of the mattress cover inward from the expanded configuration toward the unexpanded configuration when the sleeve or sleeves are deflated in the stowed configuration, thereby biasing the first and second sides of the mattress cover automatically toward each other to pull the cover inward underneath the main patient support cushion to prevent formation of excess material simultaneously at both the first and second sides of the mattress cover.

9. The patient support according to claim 8, wherein the at least one elongate member comprises at least one elastic member to bias the mattress cover to the unexpanded configuration so that, when one or both sleeves are deflated, the mattress cover automatically returns towards the unexpanded configuration.

10. The patient support according to claim 9, wherein the at least one elastic member includes two elastic members spaced along a length of the mattress, wherein the at least two elastic members extend under the mattress and are coupled to the mattress cover to apply a biasing force to pull the mattress cover inward from the extended configuration toward the unexpanded configuration when one or both sleeves are unfilled.

11. The patient support according to claim 10, wherein the mattress cover includes an upper cover portion and a lower cover portion, which are joined together by a zipper formed by an upper zipper half mounted to the upper cover portion and a lower zipper half mounted to the lower cover portion, wherein each elastic member is coupled to the lower cover portion adjacent the lower zipper half on one side of the lower cover portion and adjacent the lower zipper half on the other side of the lower cover portion.

12. The patient support according to claim 11, wherein the mattress further includes a plurality of guides to guide the elastic members, wherein the guides are mounted to the lower cover portion that is inward of ends of the elastic members, and wherein the guides are spaced inward from a lower zipper portion sufficiently to allow the lower cover portion to fold between the respective end of the elastic member and the respective guide.

13. The patient support according to claim 12, wherein:

the guides comprise a plurality of straps, with each strap having opposed ends that are secured to a respective side of the lower cover portion and a detached portion between the opposed ends forming the guide for a respective elastic member; and the guides on one side of the lower cover portion are formed from a first strap that extends along one side of the lower cover portion and which is secured to the one side of the lower cover portion at multiple anchor points with the guides for the one side being formed between the anchor points, and the guides on the other side of the lower cover portion are formed from a second strap that extends along the other side of the lower cover portion and which is secured to the other side of the lower cover portion at multiple anchor points with the guides on the other side being formed between the anchor points of the second strap to the other side of the lower cover portion.

14. A patient support comprises:

a mattress;

a mattress cover;

a pneumatic system;

the mattress including a main patient support cushion and inner and outer sealed sleeves at each side of the main patient support cushion, each sleeve being in fluid communication with the pneumatic system;

the pneumatic system being configured to inflate or deflate the outer sealed sleeves to form expansion bladders together or independently to increase a width of the mattress by one inflated expansion bladder or two inflated expansion bladders or decrease the width by deflating one or both expansion bladders; and the mattress cover being configured to expand from an unexpanded configuration to an expanded configuration to accommodate the increased widths of the mattress, and the mattress further including at least one elastic member that extends under the main patient support cushion, wherein the at least one elastic member is attached at one end at a first side of the mattress cover and attached at another end at a second side of the mattress cover opposite the first side, wherein the at least one elastic member is coupled to the mattress cover to apply a biasing force to pull the mattress cover inward toward the inner sleeves when one or both expansion bladders are deflated, thereby biasing the first and second sides of the mattress cover automatically toward each other to pull the cover inward underneath the main patient support cushion to prevent formation of excess material simultaneously at both the first and second sides of the mattress cover.

15. The patient support according to claim 14, wherein the mattress cover forms one or more folds when pulled toward or to its unexpanded configuration.

16. The patient support according to claim 14, wherein the main patient support cushion includes a plurality of inflatable bladders.

17. The patient support according to claim 14, wherein:

the elastic member or members comprise elastic straps, optionally the straps each have a generally rectangular cross-section;

the expansion bladders when filled or inflated form bolster bladders that are filled or inflated to a higher firmness or pressure than the remainder of the mattress;

the elastic member or members are adjustable and/or removable so that the length of each elastic strap is shortened to counteract an increase in length due to fatigue and a resulting reduction in tension;

the mattress cover is formed from a material including high endurance polyurethane; and when employing multiple elastic members, the ends of the elastic straps are anchored to the mattress cover via stitching or welding.

18. The patient support according to claim 14, wherein, when employing one elastic member, the elastic member is laced from one side of the mattress cover across to the other side of the mattress cover and coupled to each side of the cover using loops that are welded or otherwise adhered to the mattress cover, and wherein the ends of the one elastic member extend from one end or side of the mattress cover to allow a caregiver to pull on the ends to adjust the elastic member.

* * * * *